United States Patent [19]

Cherdron et al.

[11] Patent Number: 4,493,751
[45] Date of Patent: Jan. 15, 1985

[54] POLYOXYMETHYLENE FIBRIDS, A PROCESS FOR THEIR PRODUCTION AND THEIR USE

[75] Inventors: Harald Cherdron, Wiesbaden; Wolfgang Gordon, Hofheim am Taunus; Friedrich Kloos, Mainz, all of Fed. Rep. of Germany

[73] Assignee: Hoechst Aktiengesellschaft, Frankfurt am Main, Fed. Rep. of Germany

[21] Appl. No.: 416,154

[22] Filed: Sep. 9, 1982

Related U.S. Application Data

[63] Continuation of Ser. No. 209,015, Nov. 21, 1980, abandoned.

[30] Foreign Application Priority Data

Nov. 24, 1979 [DE] Fed. Rep. of Germany ....... 2947490

[51] Int. Cl.$^3$ .............................................. D21H 5/12
[52] U.S. Cl. .................................. 162/157.2; 162/146; 264/6; 264/14; 428/400; 428/401

[58] Field of Search ................. 162/146, 157.2–157.4; 264/6, 11, 14; 428/400, 401

[56] References Cited

U.S. PATENT DOCUMENTS 2,999,788 9/1961 Morgan .............................. 162/146
3,960,794 6/1976 Sander et al. ...................... 162/146

OTHER PUBLICATIONS

Handbook of Pulp and Paper Technology, second edition, (1970), pp. 45–46.

Primary Examiner—Peter Chin
Attorney, Agent, or Firm—Curtis, Morris & Safford

[57] ABSTRACT

The invention relates to polyoxymethylene fibrids with a reduced specific viscosity of 0.4 to 2.0 dl/g, a specific surface area of 50 to 200 m$^2$/g and a freeness of 30° to 80° SR. The fibrids are produced by flash-evaporation of a superheated solution of the polymer, a mixture of 50–95% by weight of a lower alcohol with 1–4 C atoms and 5–50% by weight of water being used as the solvent and are suitable for the production of paper.

6 Claims, No Drawings

POLYOXYMETHYLENE FIBRIDS, A PROCESS FOR THEIR PRODUCTION AND THEIR USE

This is a continuation of application Ser. No. 209,015 filed 11/21/80, now abandoned.

By fibrids there are understood small fibers which are orientated in the longitudinal direction and have a cellulose-like structure, that is to say a finite but non-uniform length, an irregular density, a fissured surface and a high degree of branching. As a result of their structure, they are particularly suitable, inter alia, for the production of paper.

The production of such fibrids is described, for example, in German Patent Specification No. 1,290,040. In this procedure, plexus filaments are first produced and are then cut into staple lengths, the staple fiber particles are suspended in a liquid and the particles in suspension are shredded in a manner which is in itself known. In this context, the term plexus filaments relates to a filament-like product of a crystalline plastic with a three-dimensional network, which is virtually free from tunnel-like channels and hollow spaces, of numerous molecular orientated film-like or silver-like fibrids which are less than 2 $\mu$ thick, are combined with one another and separate from one another along their length at irregular intervals and are preferably orientated in the direction of the longitudinal axis.

These plexus filaments and their production are described in more detail in Belgian Patent Specification No. 568,524. To produce the plexus filaments, a solution of a synthetic polymer under its autogenous pressure or under a higher pressure is extruded, at a temperature above the boiling point of the solvent under normal pressure, through an orifice into a chamber which is under a lower pressure. This production of plexus filaments is also called flash-spinning or expansion-spinning.

Plexus filaments can also be prepared from polyoxymethylene by this route, and then be shredded to fibrids. In Belgian Patent Specification No. 568,524, aprotic solvents, and in particular methylene chloride, ethylene chloride, acetonitrile and methyl ethyl ketone, are used as solvents for the production of the plexus filaments. As experiments have shown, no fibrids, but exclusively plexus filaments, are formed even at extremely low polymer concentrations, for example of 1 % by weight in methyl ethyl ketone. Since plexus filaments are unsuitable for the production of paper, according to the abovementioned German Patent Specification No. 1,290,040 they must be processed to fibrids in a second process step, and as a result the process becomes expensive. The polyoxymethylene fibrids thus obtained have, in particular, a relatively low specific surface area and a low freeness and the paper produced therefrom is of relatively low strength.

Fibrous products are likewise obtained on precipitation of polyoxymethylene from its solutions by supercooling the solution or by discharging into a precipitating agent (compare German Auslegeschrift No. 1,241,116). However, paper with satisfactory properties cannot be prepared therefrom, since these fibers are very short and thick and are highly contaminated by two-dimensional film-like structures.

Finally, it is also known, from Japanese Patent Application No. 71 41,110, that fibers are obtained by thorough stirring of a supercooled polyoxymethylene solution. However, this method is too protracted, and is also unsuitable for an industrial process because of its low yield.

The object of the present invention is to provide polyoxymethylene fibrids which are free or at least substantially free from the disadvantages of the state of the art, and in particular of the abovementioned disadvantages and to provide a process for preparing the polyoxymethylene fibrids.

The invention thus relates to polyoxymethylene fibrids with a reduced specific viscosity of 0.4 to 2.0 dl $\times g^{-1}$, preferably 0.6 to 1.20 dl $\times g^{-1}$ (measured at 140° C. in butyrolactone, which contains 2 % by weight of diphenylamine, in a concentration of 0.5 g/100 ml), a specific surface area (measured by the BET method, using argon) of 50 to 200 m²/g, preferably 70 to 110 m²/g, and a freeness (measured by the Schopper-Riegler method) of 30°–80°SR, preferably 40° to 70°SR.

The present invention also relates to a process for the production of polyoxymethylene fibrids by flashevaporation of a superheated solution of the polymer through a nozzle into a low-pressure zone, which comprises using a mixture of 50–95% by weight of a lower alcohol with 1–4 C atoms and 5–50% by weight of water as the solvent.

Suitable materials for the production of the fibrids according to the invention are the known polyoxymethylenes. By these products there may be understood homopolymers of formaldehyde or of a cyclic oligomer of formaldehyde, for example trioxane, the hydroxyl end groups of which have been stabilized chemically, for example by etherification or esterification, against degradation.

According to the invention, the term polyoxymethylene also includes copolymers of formaldehyde or of a cyclic oligomer of formaldehyde, preferably trioxane, in which, in addition to oxymethylene units, the copolymers have, in the main valency chain, oxyalkylene units with at least two, preferably two to eight and in particular two to four, adjacent carbon atoms, and primary alcohol end groups. The comonomer content of the copolymers is appropriately 0.1 to 20% by weight, preferably 0.5 to 10 and in particular 0.7–5 % by weight.

As compounds which are suitable for copolymerization with formaldehyde or cyclic oligomers of formaldehyde, preferably trioxane, there are used, above all, cyclic ethers, preferably with 3, 4 or 5 ring members, and/or cyclic acetals other than trioxane, preferably formals with 5 to 11, preferably 5, 6 or 7, ring members and/or linear polyacetals, preferably polyformals.

Suitable comonomers for trioxane are, in particular, compounds of the formular

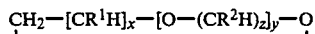

in which (A) R¹ and R² are identical or different and each denote a hydrogen atom, an aliphatic alkyl radical with 1-6, preferably 1, 2, 3 or 4, carbon atoms or a phenyl radical and (a) x is 1, 2 or 3 and y is zero, or (b) x is zero, y is 1, 2 or 3 and z is 2, or (c) x is zero, y is 1 and z is 3, 4, 5 or 6, or (B) R¹ denotes an alkoxymethyl radical with 2-6, preferably 2, 3 or 4, carbon atoms or phenoxymethyl radical, and wherein x is 1 and y is zero or y and z are 1, and R² has the abovementioned meaning.

Cyclic ethers which are employed are, above all, epoxides, for example ethylene oxide, propylene oxide, styrene oxide, cyclohexene oxide, oxacyclobutane and phenyl glycidyl ether.

Suitable cyclic acetals are, above all, cyclic formals of aliphatic or cycloaliphatic α,ω-diols with 2 to 8, preferably 2, 3 or 4, carbon atoms, the carbon chain of which can be interrupted by an oxygen atom at intervals of 2 carbon atoms, for example glycol formal (1,3-dioxolane), propanediol formal (1,3-dioxane), butanediol formal (1,3-dioxepane) and diglycol formal (1,3,6-trioxocane), as well as 4-chloromethyl-1,3-dioxolane and hexanediol formal (1,3-dioxoane). Unsaturated formals, such as butenediol formal (1,3-dioxacyclohept-5-ene) can also be used.

Suitable linear polyacetals are both homopolymers and copolymers of the cyclic acetals defined above, and linear condensates of aliphatic or cycloaliphatic α,ω-diols with aliphatic aldehydes or thioaldehydes, preferably formaldehyde. Homopolymers of linear formals of aliphatic α,ω-diols with 2-8, preferably 2-4, carbon atoms, for example poly-(1,3-dioxolane), poly-(1,3-dioxane) and poly-(1,3-dioxepane), are used in particular.

Compounds with several polymerizable groups in the molecule, for example alkylglycidyl formals, polyglycol diglycidyl ethers, alkanediol diglycidyl ethers or bis-(alkanetriol) triformals, are optionally also used as additional comonomers for trioxane, and in particular in an amount of 0.05 to 5 % by weight, preferably 0.1 to 2 % by weight, relative to the total amout of monomer. Such additional comonomers are described, for example, in German Auslegeschrift No. 2,101,817.

The values of the reduced specific viscosity (RSV values) of the polyoxymethylenes employed according to the invention and hence also of the fibrids obtained therefrom are in general between 0.4 and 2.0 dl·g$^{-1}$, preferably between 0.6 and 1.20 dl·g$^{-1}$ (measured at 140° C. in butyrolactone, which contains 2 % by weight of diphenylamine, in a concentration of 0.5 g/11 ml).

The crystallite melting points of the polyoxymethylenes are in the range from 140° to 180° C., preferably 150° C. to 170° C., and the densities of the polyoxymethylenes are between 1.38 and 1.45 g·ml$^{-1}$, preferably 1.40 and 1.43 g·ml$^{-1}$ (measured in accordance with the method of DIN 53,479).

If polymers with a lower RSV value than that given above are used, fibrids are indeed also formed; nevertheless, they become relatively short and are mixed with an increasing amount of non-fibrous constituents. The length of fiber and the degree of fineness and of branching of the fibrids can thus be controlled by the RSV value of the polymer, so that the preferred ranges depend on the field of use of the fibrids. At higher RSV values than that given above, the danger of the formation of plexus filaments or of predominantly two-dimensional, film-like structures increases.

The oxymethylene copolymers, which are preferably binary or ternary, used according to the invention are prepared in a known manner by polymerizing the monomers in the presence of cationically active catalysts at temperatures between 0° and 100° C., preferably between 50° and 90° C. (compare, for example, U.S. Pat. specification No. 3,027,352). Catalysts which are used in this preparation are, for example, Lewis acids, for example boron trifluoride and antimony pentafluoride, and complex compounds of Lewis acids, preferably etherates, for example boron trifluoride diethyl etherate and boron trifluoride di-tert.-butyl etherate. Proton acids, for example perchloric acid, and salt-containing compounds, for example triphenylmethyl hexafluorophosphate, triethyloxonium tetrafluoborate or acetyl perchlorate, are also suitable. The polymerization can be carried out in bulk, in suspension or in solution. In order to remove unstable constituents, it is expedient to subject the copolymers to controlled partial thermal or hydrolytic degradation until primary alcohol end groups are obtained (compare U.S. Pat. specification Nos. 3,103,499 and 3,219,623).

The homopolymers of formaldehyde or of trioxane which are used according to the invention are likewise prepared in a known manner by catalytic polymerization of the monomer (compare, for example, U.S. Pat. specifications Nos. 2,768,994 and 2,989,505).

The fibrids according to the invention are irregular in length, the length in most cases being about 0.1 to 5 mm, preferably 0.2 to 2 mm. The cross-section is likewise irregular in shape and size; the apparent diameter is predominantly about 1 to 200 μm, preferably 2 to 50 μm.

Since the fibrids according to the invention are highly branched, they also have a high specific surface area (measured by the BET method, using argon) of 50 to 200 m$^2$/g, preferably 70 to 110 m$^2$/g, the samples being dried beforehand by freeze-drying. Accordingly, the freeness is also high and is 30° to 80° SR, preferably 40° to 70°SR. The freeness is determined as the Schopper-Riegler value in accordance with the method in Leaflet V/7/61 (old version 107) of the Association of Cellulose and Paper Chemists and Engineers (published on July 1, 1961).

The polyoxmethylene fibrids according to the invention have hydrophilic surface properties and are therefore readily dispersible in water, in most cases even without wetting agents. Filters produced therefrom have improved adsorptive properties. In special cases it may also be expedient to produce hydrophobic surface properties by adding suitable agents which impart hydrophobic properties.

On the basis of their branched morphology, the fibrids according to the invention can very readily be processed to paper in a known manner, for example as described in German Pat. specification No. 1,290,040. The strength properties of these pure polyoxymethylene papers (tensile strength, initial wet strength, surface strength, Z-tensile strength and folding strength) are superior to those of corresponding papers according to the state of the art. Thus, the tensile strength of sheets of paper produced from the fibrids according to the invention on a Rapid-Köthen sheet-forming apparatus is 2 to 25 N/mm$^2$, preferably 4 to 20 N/mm$^2$ and in particular 7 to 17 N/mm$^2$, measured with the Instron testing unit with a sheet weight of 160 g/m$^2$, a sample width of 15 mm, an elongation rate of 10 mm/minute and a measuring length of 100 mm. The measurements are carried out at 23° C. and at a relative humidity of 50%.

Excellent papers can also be produced with mixtures with other fibrous substances, such as cellulose, cellulose fibers and synthetic fibers, and these papers can be glazed, coated, laminated and printed in the customary manner. The strength properties of these mixed papers are also considerably better than those of comparable papers produced from known polyoxymethylene fibrids.

The POM fibrids according to the invention can be employed, for example, for wallpapers, filters, labels, graph paper and other special papers and the like. The polyoxymethylene fibrids can also be processed on cardboard-making machines, the resulting cardboard having an excellent resistance to water. The polyoxymethylene fibrids according to the invention can furthermore be employed in "nonwovens" and can be used as thickeners in rapid curing cutback and in dyes, plaster, adhesives, sealing compositions and coating materials based on unsaturated polyesters, epoxide resins, bitumen pastes and PVC plastisols.

The known flash-evaporation of a superheated polymer solution under pressure into a low-pressure zone, such as is described, for example, in Belgian Patent specification No. 568,524, is carried out in the process, according to the invention, for the production of the fibrids.

In this procedure, a solution, which is preferably homogeneous, of the polymer is first prepared, it being possible to use dry or solvent-moist powder or granules, depending on the manufacturing process, and the polymer being mixed with the solvent and, for example, being heated in pressure autoclaves, while stirring, for example by steam jacket heating or by blowing in steam. If, during polymerization or the subsequent stabilizing and working-up process, the polyoxymethylenes are obtained as a solution or suspension in an alcohol/water mixture of the composition according to the invention, it is also possible to employ this solution or suspension directly in the process according to the invention.

According to the invention, as already disclosed, a mixture of 50-95% by weight of a lower alcohol with 1-4 C atoms and 5-50% by weight of water, in each case relative to the total solvent mixture, is employed as the solvent. Possible lower alcohols for this are for example, methanol, ethanol, isopropanol, n-propanol, n-butanol, i-butanol or t-butanol, or mixtures of these alcohols. If higher alcohols with more than 4 C atoms, for example n-hexanol, are used, fibrids are indeed also formed, but the temperature required for the preparation of the solution is then relatively high. Methanol and isopropanol are preferably employed.

The ratio in the mixture of alcohol and water is of considerable importance for the production of fibrids. For example, if less than 50% by weight of the lower alcohol and more than 50% by weight of water are used, plexus filaments are readily formed. Nevertheless, this dividing line between the formation of fibrids and plexus filaments is not sharp and can also be influenced to a certain extent by the choice of the temperature and of the concentration of the solution and by the choice of the molecular weight and of the dimensions of the nozzle and also of the level of the pressure in the expansion zone. With increasing temperature, decreasing polymer concentration and decreasing molecular weight and with an increasing length/diameter ratio of the nozzle and decreasing pressure in the expansion zone, this dividing line shifts somewhat in the direction of the higher content of water. If more than 95% of the lower alcohol and less than 5% of water are used, the dissolving temperature required is in most cases uneconomically high. A mixture of 45-10% by weight of water and 55-90% by weight of lower alcohol is preferred.

The concentration of the polymer in the solvent mixture is as a rule between 10 and 300 g per liter of solution, preferably between 50 and 200 g per liter. Lower concentrations are as a rule uneconomical since they require a high circulation of solvent; higher concentrations frequently involve the danger of the formation of plexus filaments. The upper limit of the polymer concentration depends to a certain extent on the molecular weight; the lower the molecular weight, the higher is the permissible concentration.

The temperature of the solution of the polyoxymethylene depends on the molecular weight of the polymer, on the nature and amount of comonomer and on the composition of the solvent. If homogeneous solutions are used, the lower limit of the temperature is to be regarded as the dissolving temperature which is required, while the upper limit of the temperature is essentially imposed only by economic considerations. The dissolving temperatures is known for many examples, and can otherwise easily be interpolated from known data or experimentally determined by the expert. In any case, the lower limit of the temperature must be such that evaporation sufficient for the formation of fibrids takes place in the expansion zone under the chosen pressure conditions. This is as a rule the case if it is about 30° C. above the boiling point under normal pressure and at the same time the solidification point of the polymer is reached. For the preferred alcohols in their preferred ratios in the mixture, the preferred temperature range is between 150° and 180° C.

The solution is as a rule under the autogenous vapor pressure of the solvent mixture at this temperature, but the pressure can be increased considerably by an inert gas pressure or by a pump. In general, the pressure is between 15 and 60 bars, preferably between 15 and 30 bars.

In addition to the polymers, the solution can also contain auxiliaries from the polymerization, for example decomposition products of the catalysts for cationic polymerization, which are described in British Pat. specification No. 1,146,649, in German Offenlegungsschriften Nos. 1,595,705 and 1,595,668 and in German Auslegeschriften Nos. 1,199,504 and 1,175,882, or basic compounds in order to remove unstable constituents until the primary alcohol end group is obtained (for example lower tertiary aliphatic amines, such as triethylamine or triethanolamine, or a secondary alkali metal phosphate, such as disodium hydrogen phosphate (compare U.S. Pat. Nos. 3,174,948, 3,219,623 and 3,666,714)), and the resulting reaction products, for example methylal, trioxane, tetroxane, formic acid and methyl formate.

The polymer solution can also contain the most diverse known additives. Possible additives are, for example, the customary nucleating agents which accelerate crystallization and with the aid of which the morphology of the fibrids can be influenced, such as, for example, branched or crosslinked polyoxymethylenes, talc or boron nitride (compare German Pat. specification No. 2,101,817 and German Offenlegungsschrift No. 1,940,132).

There may also be mentioned in this context the known stabilizers against the influence of heat, oxygen and/or light, such as are described, for example, in German Offenlegungsschrift No. 2,043,498. Bisphenol compounds, alkaline earth metal salts of carboxylic acids and guanidine compounds are particularly suitable for this. Bisphenol compounds which are used are chiefly esters of monobasic 4-hydroxyphenylalkanoic acids which contain 7-13, preferably 7, 8 or 9, carbon atoms and are monosubstituted or disubstituted on the nucleus by an alkyl radical containing 1-4 carbon atoms, with aliphatic dihydric, trihydric or tetrahydric alcohols which contain 2-6, preferably 2, 3 or 4, carbon atoms, for example esters of ω-(3-tert.-butyl-4-hydroxyphenyl)-pentanoic acid, β-(3-methyl-5-tert.-butyl-4-hydroxy-phenyl)-propionic acid, (3,5-di-tert.-butyl-4-hydroxy-phenyl)-acetic acid, β-(3,5-di-tert.-butyl-4-hydroxy-phenyl)-propionic acid or (3,5-di-isopropyl-4-hydroxy-phenyl)-acetic acid with ethylene glycol, propane-1,2-diol, propane-1,3-diol, butane-1,4-diol, hexane-1,6-diol, 1,1,1-trimethylolethane or pentaerythritol.

Alkaline earth metal salts of carboxylic acids which are used are, in particular, alkaline earth metal salts of aliphatic monobasic, dibasic or tribasic carboxylic acids which preferably contain hydroxyl groups and have 2-20, preferably 3-9, carbon atoms, for example the calcium or magnesium salts of stearic acid, ricinoleic acid, lactic acid, mandelic acid, malic acid or citric acid.

Possible guanidine compounds are compounds of the formula

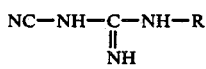

in which R denotes a hydrogen atom, a cyano group or an alkyl radical with 1-6 carbon atoms, for example cyanoguanidine, N-cyano-N'-methylguanidine, N-cyano-N'-ethylguanidine, N-cyano-N'-isopropylguanidine, N-cyano-N'-tert.-butylguanidine or N,N'-dicyanoguanidine. The guanidine compound is employed, if appropriate, in an amount of 0.01-1% by weight, preferably 0.02-0.5% by weight, relative to the total weight.

Furthermore, the solution can additionally also contain other additives, such as known antistatic agents, flameproofing agents or slip agents or lubricants and the like.

Filled fibrids can be obtained according to the invention by uniformly suspending mineral fillers in the polymer solution and then proceeding as described. Suitable fillers are titanium dioxide, calcium carbonate, talc, woolastonite, dolomite, silicon dioxide and the like.

Dyed polyoxymethylene fibrids can be obtained by dissolving or dispersing dyestuffs in the polymer solution. For some applications, the addition of optical brighteners is also of interest.

Surface-active agents, such as oxyethylated alcohols, carboxylic acids or amines, alkanesulfonates or polymers carrying hydroxyl groups, such as polyvinyl alcohol or carboxymethylcellulose, can also be added to the solution in order to improve the dispersibility of the polyoxymethylene fibrids.

The polymer solution is then forced through one or more nozzles, the design (size, shape and length) of which can indeed influence the dimensions of the fibrids formed and change somewhat the concentration limits given for the solvent mixture, but is not essential to the invention. Suitable nozzles are described, for example, in Belgian Pat. specification No. 568,524. In this context there may be mentioned simple nozzles with a diameter of, for example, 0.5-5 mm and a length of 0.1 to 1,000 cm, conical nozzles with a comparable annular gap and two-material nozzles, it being possible to use inert gases, such as hydrogen, steam and the like, or liquids, for example superheated water, as the propelling medium.

The polymer solution passes through the nozzle into a zone of lower pressure, in which the solvent is completely or partly evaporated spontaneously. It is also possible to subject the solution to a controlled pressure release, before its exit from the nozzle, for example by passing it through a chamber or a tube which has a greater diameter than the outlet opening of the nozzle. Any residues of the lower alcohol present can be removed, for example, by steam. As a rule, the low-pressure zone is a closed container, from which the solvent vapors are removed with a pump. These vapors can be recycled back, after condensation, into the process. The pressure in the low-pressure zone is between 0.02 bar and 2.0 bars, preferably between 0.1 and 1 bar.

The fibrids are then freed from most of the solvent which has not evaporated off, using known mechanical methods, for example by filtration, centrifugation and the like, and, if necessary, are washed with water and then either put to use in moist form or loosened mechanically to a density of 10 to 200 g/l, preferably 30 to 100 g/l, and then dried in a steam of hot gas.

A considerable advantage of the process according to the invention is that the fibrids are formed directly during atomization and the troublesome and energy-intensive two-stage process, which consists of the production of plexus filaments of infinite length and subsequent mechanical comminution, is thereby avoided. Since the plexus filaments have a high extensibility, this mechanical comminution can be carried out only with a high energy consumption.

This process advantage and the substance advantages of the polyoxymethylene fibrids according to the invention could not be predicted and are therefore to be regarded as surprising.

The examples which follow are intended to illustrate the invention in more detail.

EXAMPLE 1

2 kg of a copolymer which is obtained from 98% by weight of trioxane and 2% by weight of ethylene oxide, and has a RSV value of 0.82 dl/g, and 20 ml of triethylamine are dissolved in a mixture of 13 l of methanol and 7 l of water at 160° C., while stirring, in a pressure vessel which has a volume of 70 l and is provided with a five-blade multi-stage impeller countercurrent stirrer. An overall pressure of 30 bars is established with the aid of nitrogen. After opening the bottom valve, the solution flows through a single-hole nozzle with a diameter of 1 mm and a length of about 0.5 mm into the gas spaced of a closed collecting tank which has a capacity of 200 l and is filled with 40 l of water and in which a vacuum pump ensures a pressure of 0.8 bar. When atomization has ended, methanol is driven off for 30 minutes by sweeping with steam, the pressure being maintained at 0.8 bar. The fibrid suspension formed is removed through a bottom flap and centrifuged down to a solids content of about 20%.

In order to determine the specific surface area of the resulting fibrids, a sample was freeze-dried and measurements were carried out by means of the BET method, using argon. The specific surface area was 73 m²/g and the freeness was 50°SR.

Fiber classification in a Brecht Holl fiber classification unit serves as an indirect measure of the fiber length distribution. In this unit, 2 g of fibers are washed successively through sieves of different sizes for 10 minutes with the aid of water jets under a water pressure of 0.5 bar and using a pulsating suction membrane (with as large as possible a stroke). The residue on the sieves with mesh widths of 1.2 mm, 0.4 mm and 0.12 mm and the amount which passes through are given in percent.

The following fractions were determined in the fiber classification described above:

| | |
|---|---|
| Residue | 1.2 mm: 0% |
| Residue | 0.4 mm: 17% |
| Residue | 0.12 mm: 54% |
| Amount passing through | 0.12 mm: 29% |

Sheet of paper of 160 g/m² are produced with these fibrids on a Rapid-Köthen sheet-forming apparatus. The tensile strength measured for these sheets was 14.3 N/mm².

COMPARISON EXPERMIMENT 1

As described in Example 1, 2 kg of the same copolymer were dissolved in 20 l of methyl ethyl ketone under the same temperature and pressure conditions and the solution was atomized into the same tank through the same nozzle, a pressure of 0.8 bar likewise being maintained in the tank. The product formed consisted exclusively of continuous plexus filaments which, in this form, were unsuitable for the production of paper. A sample was therefore comminuted by means of a disk refiner, in 6 passes. The following values were found on the fibrids thus produced:

| | |
|---|---|
| Specific surface area | 39 m²/g |
| Freeness | 27° SR |
| Fiber classification: | |
| Residue 1.2 mm | 3% |
| Residue 0.4 mm | 4% |
| Residue 0.12 mm | 26% |
| Amount passing through 0.12 mm | 67% |
| Tensile strength of the sheet (160 g/m²) | 0.37 N/mm² |

Plexus filaments which are unsuitable for the production of paper were also obtained when the polymer concentration was reduced to 0.01 kg/l.

COMPARISON EXPERIMENT 2

The procedure followed was as in Example 1. However, the solvent composition was 5 l of methanol and 15 l of water. Plexus filaments which, in this form, were unsuitable for the production of paper were exclusively formed.

EXAMPLE 2

The procedure followed was as in Example 1. However, the RSV value of the polymer used was 1.0 dl/g and the solvent composition was 15 l of methanol and 5 l of water. The following values were measured on the resulting fibrids:

| | |
|---|---|
| Specific surface area | 98 m²/g |
| Freeness | 61° SR |
| Fiber classification: | |
| Residue 1.2 mm | 0% |
| Residue 0.4 mm | 5% |
| Residue 0.12 mm | 55% |
| Amount passing through 0.12 mm | 40% |
| Tensile strength of paper | 13.2 N/mm² |

EXAMPLE 3

The procedure followed was in Example 1, but isopropanol was used instead of methanol. The following values were measured on the resulting fibrids:

| | |
|---|---|
| Specific surface area | 108 m²/g |
| Freeness | 68° SR |
| Fiber classification: | |
| Residue 1.2 mm | 6% |
| Residue 0.4 mm | 4% |
| Residue 0.12 mm | 24% |
| Amount passing through 0.12 mm | 66% |
| Tensile strength of paper | 11.7 N/mm² |

We claim:
1. Highly branched polyoxymethylene fibrids with a reduced specific viscosity of 0.4 to 2.0 dl/g, a specific surface area of 50 to 200 m²/g, said specific surface area being measured at 140° C. in butyrolactone, which contains 2% by weight of diphenylamine, in a concentration of 0.5 g/100 ml, a freeness of 30° to 80° SR, a length of about 0.1 mm to 5 mm and an apparent diameter of about 1 to 200 μm.
2. Polyoxymethylene fibrids, as clamied in 1, in which the specific surface area is 70 to 110 m²/g.
3. Polyoxymethylene fibrids, as claimed in claim 1 or 2, in which the freeness is between 40° to 70° SR.
4. Polyoxymethylene fibrids, as claimed in claim 2, wherein the freeness is between 40° and 70° SR.
5. Polyoxymethylene fibrids, as claimed in claim 1, wherein the reduced specific visosity is 0.6 to 1.20 dl/g.
6. A paper comprising the fibrids as claimed in claim 1, 2, 4 or 5.

* * * * *